US011884514B2

(12) United States Patent
Blochle et al.

(10) Patent No.: US 11,884,514 B2
(45) Date of Patent: Jan. 30, 2024

(54) SAFETY BRAKE DEVICE AND SAFETY BRAKE METHOD

(71) Applicant: Inventio AG, Hergiswil (CH)

(72) Inventors: Hans Blochle, Stans (CH); Adrian Steiner, Inwil (CH); Daniel Meierhans, Sins (CH); Julian Stahli, Meggen (CH)

(73) Assignee: INVENTIO AG, Hergiswil (CH)

( * ) Notice: Subject to any disclaimer, the term of this patent is extended or adjusted under 35 U.S.C. 154(b) by 209 days.

(21) Appl. No.: 17/593,211

(22) PCT Filed: Mar. 13, 2020

(86) PCT No.: PCT/EP2020/056899
§ 371 (c)(1),
(2) Date: Feb. 28, 2022

(87) PCT Pub. No.: WO2020/187757
PCT Pub. Date: Sep. 24, 2020

(65) Prior Publication Data
US 2022/0177272 A1 Jun. 9, 2022

(30) Foreign Application Priority Data
Mar. 15, 2019 (DE) ........................ 202019101479.2

(51) Int. Cl.
*B66B 5/22* (2006.01)

(52) U.S. Cl.
CPC ...................................... *B66B 5/22* (2013.01)

(58) Field of Classification Search
CPC ........................................................ B66B 5/22
See application file for complete search history.

(56) References Cited

U.S. PATENT DOCUMENTS 2,716,467 A 8/1955 Callaway
8,186,483 B2 * 5/2012 Sirigu ....................... B66B 5/22 187/373

(Continued)

FOREIGN PATENT DOCUMENTS

CA 2613124 A1 6/2008
CN 101148233 A 3/2008

(Continued)

OTHER PUBLICATIONS

English Machine Translation of CN 109019229.*

*Primary Examiner* — Diem M Tran
(74) *Attorney, Agent, or Firm* — William J. Clemens; Shumaker, Loop & Kendrick, LLP

(57) ABSTRACT

A method and device for safety braking an elevator having an upright guide rail wherein the device includes a housing having braking elements on both sides of and being movable along the guide rail, a safety restraint on both sides between the housing and the braking elements, and a clampable and lockable actuating device that unlocks and unclamps in response to a triggering event and brings the braking elements into braking engagement with the guide rail. The actuating device, when unclamped, develops a feed force and movement transverse to the guide rail longitudinal axis engaging the braking elements with the guide rail from a laterally distanced initial position, wherein the braking elements are entrained by frictional contact on the guide rail and enter the safety restraint, and wherein the actuating device is moved back into the initial position, clamped and locked by the braking elements located in the safety restraint.

17 Claims, 9 Drawing Sheets

(56) References Cited

U.S. PATENT DOCUMENTS

| | | | | |
|---|---|---|---|---|
| 9,856,112 | B1 | 1/2018 | Cirone | |
| 2007/0051563 | A1 | 3/2007 | Oh et al. | |
| 2016/0289045 | A1* | 10/2016 | Osmanbasic | F16D 63/008 |
| 2017/0050822 | A1 | 2/2017 | Wurth et al. | |

FOREIGN PATENT DOCUMENTS

| | | | | | |
|---|---|---|---|---|---|
| CN | 101200259 | A | * | 6/2008 | B66B 5/22 |
| CN | 101200259 | A | | 6/2008 | |
| CN | 102092617 | A | | 6/2011 | |
| CN | 102602772 | A | | 7/2012 | |
| CN | 104936882 | A | | 9/2015 | |
| CN | 109019229 | A | | 12/2018 | |
| CN | 109019239 | A | | 12/2018 | |
| CN | 109384118 | A | | 2/2019 | |
| DE | 102016200593 | A1 | | 7/2017 | |
| EP | 1292524 | B1 | | 3/2003 | |
| EP | 1294631 | B1 | | 3/2003 | |
| EP | 1902993 | A1 | | 3/2008 | |
| EP | 1930282 | A1 | | 6/2008 | |
| JP | 2013018645 | A | | 1/2013 | |
| JP | 2013018645 | A | * | 1/2013 | |
| WO | 2005044709 | A1 | | 5/2005 | |
| WO | WO-2005044709 | A1 | * | 5/2005 | B66B 5/02 |
| WO | 2011113754 | A1 | | 9/2011 | |
| WO | 2013070234 | A1 | | 5/2013 | |
| WO | 2015071188 | A1 | | 5/2015 | |
| WO | 2015144686 | A1 | | 10/2015 | |
| WO | WO-2021099562 | A1 | * | 5/2021 | B66B 5/22 |
| WO | WO-2021115846 | A1 | * | 6/2021 | B66B 5/22 |

* cited by examiner

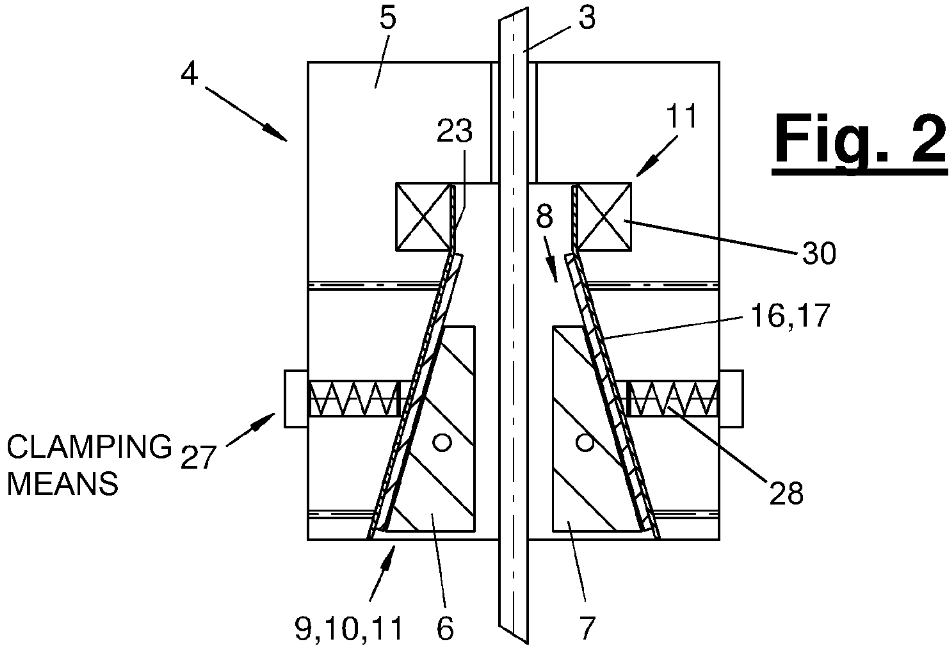
Fig. 2
Fig. 3
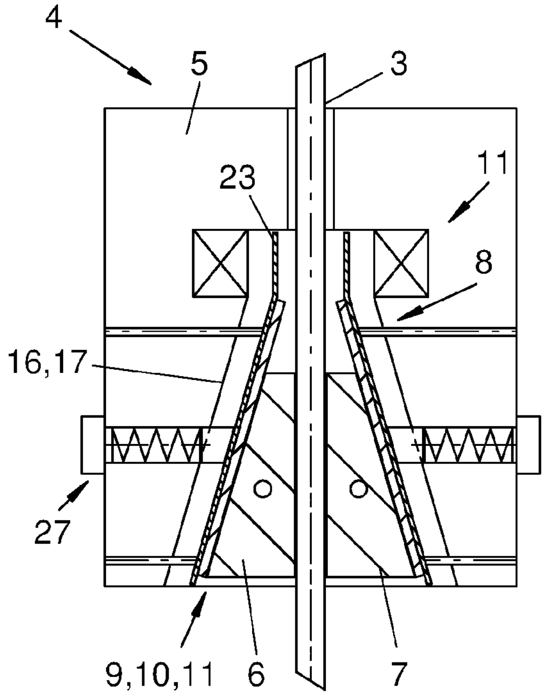
Fig. 4
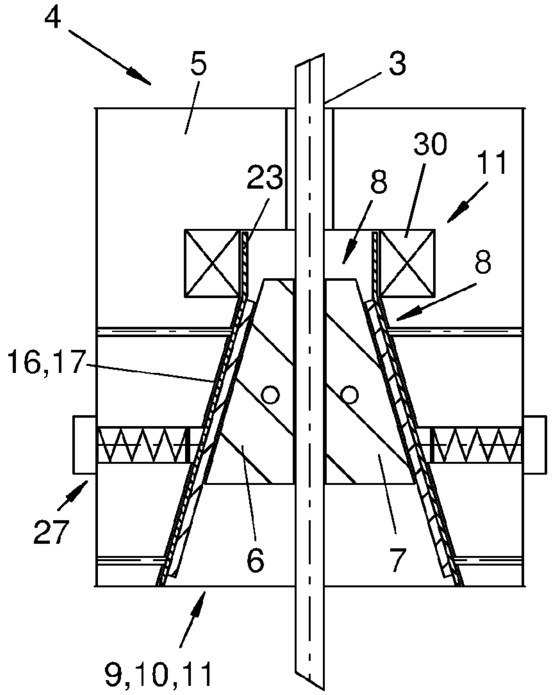

SAFETY BRAKE DEVICE AND SAFETY BRAKE METHOD

FIELD

The invention relates to a safety brake device and a safety brake method for an elevator having an upright guide rail.

BACKGROUND

Such a safety brake device is known from WO 2005/044709 A1. The clampable and lockable actuating device, when unclamped, executes a feed movement and feed force directed along the longitudinal axis of the guide rail, which drive the braking elements into the safety restraint which narrows in a wedge-shaped manner, the braking elements being pressed against the guide rail by the wedge effect and braking the car movement. In order to release the safety brake device, the actuating device has to be brought back by an additional restoring apparatus having a motor and a spindle and in response to a separate control signal.

Similar safety brake devices having wedge-shaped safety restraints and actuating devices having feed forces and feed movements directed along the longitudinal axis of the guide rail are disclosed in U.S. Pat. No. 2,716,467 A, EP 1 292 524 B1 and EP 1 294 631 B1.

EP 1 902 993 A1 discloses a safety brake device having a single roller-shaped braking element which is arranged only on one side of the guide rail, and the roller axis of which runs on a pivotable slotted guide into a wedge gap which forms a one-sided safety restraint.

A safety brake device having a one-sided arrangement of a safety restraint and a movable braking element on the guide rail is also known from WO 2015/071188 A1. The movable, wedge-shaped braking element is driven into the safety restraint by a pivot lever with a force and feed movement directed along the longitudinal axis of the guide rail.

EP 1 930 282 A1 teaches a special stop and emergency stop braking device for an elevator system, which is designed for three different braking situations of a normal floor stop, emergency stop braking and free-fall braking. For this purpose, the device has two separate, structurally identical brake circuits which are arranged on both sides of the guide rail and which respond and act differently depending on the direction of travel. The identical components and wedge directions of one brake circuit and the other brake circuit have different dimensions and are also arranged so as to be mirror-inverted with respect to one another.

SUMMARY

The problem addressed by the present invention is that of providing improved safety brake technology.

The described safety brake technology, i.e. the safety brake device and the safety brake method, have various advantages. They offer greater operational and accident safety and develop a stronger, better and possibly smooth braking effect.

The braking elements entering the safety restraint can move the actuating device back into its initial position and clamp it, it also being possible for the actuating device to be locked in this initial position again. The actuating device thus automatically returns to its initial position during the safety brake action and is ready for the next safety brake application. The initial position can be the stand-by position of the safety brake device.

The claimed safety brake device can be released from the catch position again in a simple manner, after the catch situation has occurred, by moving, in particular lifting, the car. An additional restoring apparatus, as in WO 2005/044709 A1, is unnecessary.

As a result of its compact design, the claimed safety brake device requires little space and has a simple design which is advantageous for safety aspects. This also distinguishes this device from WO 2005/044709 A1. The claimed safety brake device can also be controlled in a simple manner and, if necessary, can also be actuated and restored automatically in the event of an energy failure of the elevator.

The safety brake device advantageously has a housing having braking elements, preferably wedge-shaped brake shoes, which are arranged on both sides of the guide rail and are movable along the guide rail, as well as a safety restraint on both sides between the housing and the braking elements. In this way, a high and reliable braking force can be generated and supported. The safety restraint can be rigid or resilient. A design which is resilient and able to yield slightly makes a gradual increase in the braking effect possible and prevents a hard, jerking braking jolt.

The safety brake device also has a clampable and lockable actuating device for the braking elements, the actuating device unlocking and unclamping in response to a triggering event and bringing the braking elements into braking engagement with the guide rail. The actuating device, when it is unclamped, develops a feed force directed transversely to the longitudinal axis of the guide rail and a likewise directed feed movement, which brings the braking elements on both sides into engagement with the guide rail from a laterally distanced initial position. The aforementioned orientation transverse to the longitudinal axis of the guide rail includes an oblique orientation. A triggering event can be, for example, a detected excessive speed and/or acceleration of the cabin movement.

Due to the resulting frictional contact on the guide rail, the braking elements are entrained and enter the safety restraint. In so doing, the braking elements move the actuating device back into its initial position and clamp it, it being possible for the actuating device to be locked in this initial position again. When the car is released from the safety restraint, the braking elements can be moved back by means of friction on the guide rail and their own weight and can return to their initial position. An additional spring, adjusting device or the like is not required for moving the braking elements back.

The actuating device can develop a feed force and feed movement directed exclusively or predominantly transversely to the longitudinal axis of the guide rail. An additional feed force and feed movement directed along the guide rail can be dispensed with.

The actuating device can have a clampable feed device for the braking elements and a controllable locking device for the feed device. The locking device can be connected to a trigger of the safety brake device.

The clampable feed device moves the braking elements on both sides in the aforementioned manner transversely to the longitudinal axis of the guide rail and presses the braking elements against the guide rail with a likewise directed clamping force. The locking device can lock or block the feed device in the clamped initial position. The braking elements are out of engagement with the guide rail in this case. The safety brake device is then deactivated.

In response to a triggering event, the locking device releases the feed device which presses the braking elements against the guide rail in the aforementioned manner and the safety brake operation is carried out. The triggering event can be of any nature. It can be an electrical or mechanical control signal, an energy failure of the elevator or the like. The locking device can lock the feed device again when the feed device is moved back into its initial position and clamped by the braking elements entering the safety restraint.

The safety brake device can have a guide device for the braking elements. By means of the guide device, the braking elements can be guided to the guide rail in a predetermined manner when they are acted upon by the feed device and can be guided along the guide rail into the safety restraint. The guide device can be designed and arranged in different ways.

The guide device can be arranged on the feed device. The braking elements are entrained during feeding and, after contact with the rail, are guided into the safety restraint by the guide device during the entry movement.

The guide device can also be arranged between the housing and the braking elements. This can, for example, be a slotted guide, a pivot guide or the like. As a result, the braking elements are positioned and held in the initial position at a lateral distance from the guide rail. This can be achieved by means of the braking elements' own weight or by applying light additional force. The guide device can be connected directly or indirectly to the housing.

The safety restraint can be designed in different ways. The design as a wedge restraint offers particular advantages. The safety restraint is arranged on both sides of the guide rail and acts on the braking elements which are movable on both sides. The arrangement of the safety restraint between the braking elements and the housing has the advantage that very high wedge forces and braking forces can be supported. The housing can also be arranged so as to float, to a limited extent, transversely to the guide rail. This is favorable for an even distribution of force on both sides of the guide rail.

The safety restraint can be arranged between the braking elements and one or more support means arranged on the housing.

The one or more support means can be rigidly arranged and fastened on the housing. The support means can be solid and able to withstand high loads. The one or more support means and a connecting housing part can form a stable wedge yoke. An optionally one-piece and, for example, yoke-like support means can also form the housing.

The one or more support means can alternatively be movably arranged on the housing. The mobility can in particular be in the direction transverse to the longitudinal axis of the guide rail. The movable support means can be subjected to force by a particularly rigid spring arrangement in the direction transverse to the longitudinal axis of the guide rail. The stiff spring arrangement makes a slight yielding of the support means possible when the braking elements enter the safety restraint. This has the advantage of a gradually increasing braking effect and thus a lower deceleration and smoother braking. The spring arrangement, which is tensioned when moving into the catch position, develops a high clamping force which ensures the braking and frictional connection. The one or more support means can also be designed as a spring arrangement. This spring arrangement can be held and guided on the housing, optionally in a floating position.

The spring arrangement can be designed in different ways. It can be formed, for example, by individual springs which each act on a support means and are supported on the housing. The spring arrangement can also have a bracket-like or annular spring shape, for example as a C-spring. The spring arrangement is open on one side and can laterally encompass the guide rail, the spring arrangement being spread or expanded when the braking elements enter the safety restraint.

One embodiment of a wedge restraint can have interacting wedge surfaces on a braking element on one side, and on a support means of the housing or on the feed device on the other side.

The feed device can have an actuating means which can be brought into contact with a braking element and a clamping means. In this case, a dedicated actuating means and a dedicated clamping means can be associated with each of the movable braking elements. Alternatively, a common actuating means and a common clamping means for the braking elements on both sides are possible.

The clamping means acts on the actuating means. The actuating means in turn acts on an associated braking element and moves the braking element with the aforementioned force and feed movement transversely to the longitudinal axis of the guide rail. The clamping means and the actuating means can be separate parts which interact. However, they can also be combined with one another to form an integral part and a structural and functional unit. The structural and functional unit is structurally simple, inexpensive and particularly reliable.

The clamping means or the energy store of the clamping means of such a structural and functional unit can, for example, be designed as a torsion spring, a clamped leaf spring or the like. The actuating means can be formed by a protruding arm of the clamping means. The clamping means can also guide the actuating means. The actuating means can have an action point for the locking device, in particular the actuator, for example a magnet. The support point of the, for example, pretensioned clamping means is distanced from the action point. As a result, the holding force acting counter to the clamping torque can be low and the locking device, in particular an electromagnet, can be relieved. The action point and support point can be arranged at the end regions of the structural and functional unit. For example, the points can be located on both sides of the braking element. In order to set the desired clamping torque or the clamping force, the clamping means can be exchangeable or adjustable.

The actuating means can be movably arranged on the housing transversely to the longitudinal axis of the guide rail. The actuating means can execute a translatory or rotary movement or a combined movement. The feed device can have a corresponding guide for the actuating means. This guide can, for example, be formed and arranged between the actuating means and the housing. In the case of the structural and functional unit, the clamping means can guide the actuating means. A separate guide is not required.

The actuating means can be arranged on the rear face of the braking element that faces away from the guide rail. The actuating means can in this case be located between an associated braking element and the housing, in particular an aforementioned support means. When the braking element enters the safety restraint, the actuating means is moved back into its initial position. In the initial position and the catch position, the actuating means can rest loosely against the rigid or movable or resilient support means. Pressure forces can be transmitted in this case.

A design of the actuating means as a parallel-walled transmission plate is favorable. In the safety restraint, the actuating means is clamped, for example, between the wedge-shaped support means and the rear face of the braking element and transmits the clamping forces for the safety braking without loss.

In another variant, the feed device can have the wedge surface. The actuating means can be designed, for example, as a wedge body on which the wedge surface which interacts with the braking element is arranged to form the aforementioned safety restraint. A rigid support means can have an adapted recess having support elements, in particular a support surface, for receiving and supporting the wedge body in the initial position and catch position. A movable support means can be designed as a spring arrangement. In this way, a resilient safety restraint can be formed.

The braking element can slide in the longitudinal direction of the rail along the guide rail and the actuating means and can be moved into the safety restraint. The actuating means can have a suitable sliding means for this purpose. The braking element can also be guided on the actuating means.

The feed device can have the aforementioned guide for the actuating means. This can be designed in different ways. The guide can be a linear guide, for example. Alternatively, a rotary guide or a combination of a rotary and linear guide is also possible. The guide can be arranged on the housing. It can also be arranged on a rigid or movable support means.

The clamping means of the feed device has an energy store which can be designed in different ways. The clamping means or the energy store generates the force which is oriented transversely to the longitudinal axis of the guide rail and by means of which the respectively acted-on braking element is fed to and pressed against the guide rail.

The energy store can be designed, for example, as a spring, in particular a linear compression spring or a torsion spring. It can also be designed as a bracket-like or annular spring, for example as a C-spring, and can laterally encompass the guide rail. In this case, a design as a lamellar spring, for example, is possible.

The energy store can also store potential energy of the actuating means, in particular of the wedge body thereof, or of a weight. In another design variant, the energy store can be designed as an activatable drive element, for example as a fluidic or motorized drive element, as a piezo element or the like.

Such an activatable energy store can advantageously be combined with an emergency supply device, in particular an emergency power supply, which ensures that the safety brake device functions reliably even in the event of an energy failure of the elevator. Conversely, in the case of a fail-safe design of the feed device, the actuator can be deactivated if a triggering of the brake in the event of a power failure is not desired or not required.

The locking device can hold the clampable feed device in the initial position. The locking device can thus prevent malfunctions. In addition, the applied safety brake device can be released again by a simple movement of the car, thanks to the locking device.

The locking device can have an actuator acting on the feed device. The actuator can in this case act directly or indirectly, for example via a locking means, on the feed device. In the case of a direct action, the actuator can, for example, advantageously be designed as an electromagnet. The actuator can be arranged on the housing or on a, for example, movable support means or at another location.

The arrangement of an interposed locking means, for example a latch mechanism, can relieve the actuator. The holding and locking force can be applied by the locking means, for example by means of an interlocking connection. In this case, the triggering force applied by a spring, for example, and the opposing holding force of the actuator acting on the locking means can be small. In a design of this kind, the actuator can have a significantly reduced energy consumption.

The locking device can act directly or indirectly on one or more components of the feed device. A locking action is possible, for example, on the actuating means, on the clamping means or on both the actuating means and the clamping means.

The actuator can be connected to the trigger of the safety brake device. The actuator can be controlled by the trigger. The actuator can also carry out an emergency triggering in the event of an energy failure of the elevator. In the case that the actuator is designed as an electromagnet, this happens automatically in the event of a power failure of the elevator. The actuator can also be connected to an emergency supply device, in particular an emergency power device.

DESCRIPTION OF THE DRAWINGS

The invention is shown schematically and by way of example in the drawings, which specifically show:

FIGS. 2 to 4: the safety brake device from FIG. 1 in different operating positions.

DETAILED DESCRIPTION

Figure 1:
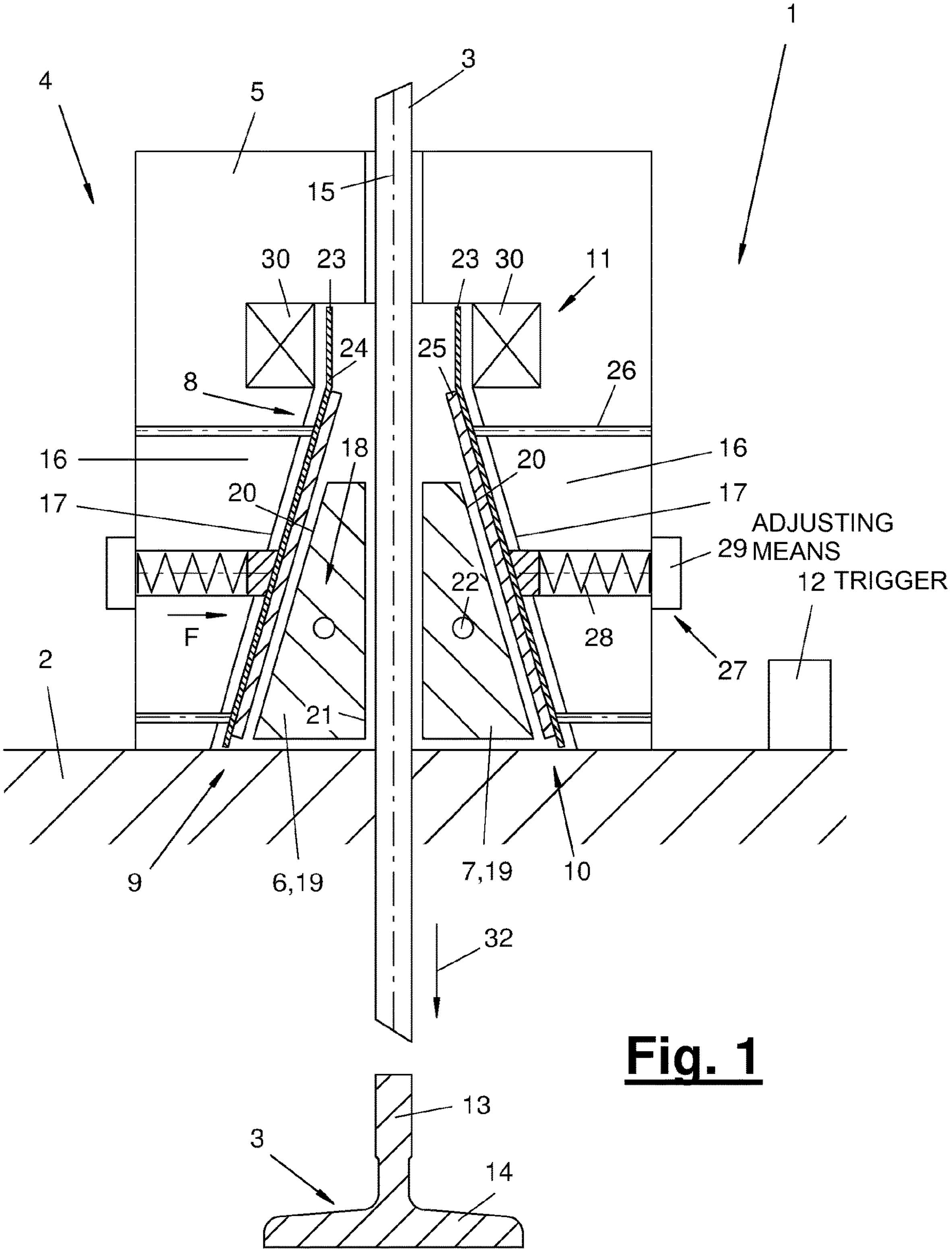
FIG. 1: a schematic view of a guide rail and a safety brake device on an elevator.

The invention relates to a safety brake device (4) for an elevator (1) and a safety brake method. The invention also relates to an elevator (1) equipped with a safety brake device (4).

The elevator (1) has a car (2), at least one guide rail (3) and a safety brake device (4). The elevator (1) also has a drive for the car (2) and optionally a counterweight. The elevator (1) and the car (2) are only indicated in FIG. 1. The guide rail (3) is shown in FIG. 1 in a front view and below in a cross section.

The safety brake device (4) is arranged on the car (2) individually or in multiple places. The safety brake device can be arranged in any suitable position, e.g. on the car roof, on a side of the car facing the guide rail (3) or also on or below the car floor and on the roller guide or the like, by means of which the car (2) is guided on the guide rail (3). Additionally or alternatively, the safety brake device (4) can be arranged on the counterweight.

The guide rail (3) has an upright, preferably vertical, orientation and has a longitudinal axis (15). The guide rail (3) can, for example, have the T-shape shown in cross section, having a projection (13) and a transverse back (14) provided for mounting the rail. The guide device of the car (2) and the safety brake device (4) can engage on the projection (13).

FIGS. 1 and 5 to 10 show different embodiments of the safety brake device (4). In FIGS. 2 to 4, the safety brake device (4) from FIG. 1 is shown in different operating positions.

The safety brake device (4) is used to automatically brake the car (2) in particular operating situations, in particular emergencies, and to bring it to a standstill, in particular when the car is moving downward in the direction of travel (32). A particular operating situation of this kind occurs, for example, when the car (2) moves at a greater speed and/or acceleration than intended, when the energy supply, in particular the electrical power supply, of the elevator (1) fails, or when another triggering event occurs. For this purpose, the safety brake device (4) can be acted upon and activated by a trigger (12) which is shown schematically in FIG. 1. The trigger can optionally detect the aforementioned particular operating situation.

The safety brake device (4) shown in FIG. 1 has a housing (5) which is suitably connected to the car (2) or the counterweight in a load-bearing manner. The housing (5) can be arranged rigidly or so as to float relative to the guide rail (3). A floating movement is in particular possible transversely to the longitudinal axis (15) of the rail.

Two or more braking elements (6, 7) are arranged in the housing (5) and are arranged on both sides of the guide rail (3), in particular on both sides of the projection (13) thereof. The braking elements (6, 7) can move transversely to the longitudinal axis (15) and also along the longitudinal axis (15).

A guide device (18) may be present between the housing (5) and the braking elements (6, 7). The guide device can have a curved shape having a guide portion directed transversely to the longitudinal axis (15) of the guide rail (3), and an adjoining guide portion directed along the longitudinal axis (15). The guide device (18) is formed, for example, by a slotted guide on the housing (5) and a, for example, pin-shaped or roller-shaped guide means (22) on the relevant braking element (6, 7) that engages in the slotted guide. The other parts of the guide device (18) are not shown for the sake of clarity.

In FIG. 1, a braking element (6, 7) is arranged on both sides of the guide rail (3) or the projection (13). The number of braking elements (6, 7) which are each arranged on both sides can also be higher.

In the embodiments shown, the braking elements (6, 7) are designed, for example, as brake shoes (19). The brake shoes (19) can have a wedge shape and can be designed as wedge shoes. The brake shoes each have a wedge surface (20) on the rear face thereof that faces away from the guide rail (3) or the projection (13). This wedge surface is inclined toward the guide rail (3), the braking element (6, 7) tapering upward. The front face of the braking elements (6, 7) that faces the guide rail (3) or the projection (13) is oriented in parallel with the guide rail (3) or the projection (13) and the lateral surfaces thereof. The front face forms a friction-active pressing surface (21) and braking surface.

The safety brake device (4) has a safety restraint (8) on both sides between the housing (5) and the braking elements (6, 7) on both sides. In the embodiments shown, the safety restraint (8) is designed as a wedge restraint.

In the variants from FIGS. 1 to 6, the safety restraint is formed by one or more support means (16) which are arranged and supported in the housing (5) on both sides of the guide rail (3) or the projection (13). The one or more support means (16) are rigid and fixed to the housing. They are rigidly arranged and fastened on the housing (5) or can be formed by the housing (5). The safety restraint (8) is rigid. The safety restraint can optionally float with the housing (5).

The support means (16) has/have a wedge surface (17) on the front face thereof facing the guide rail (3), which wedge surface in each case extends upward and is inclined in the direction of the guide rail (3). The two wedge surfaces (17) on both sides form a funnel-shaped wedge catch opening which the braking elements (6, 7) can enter.

The wedge surfaces (17, 20) on the support means (16) and the braking elements (6, 7) are matched to one another in terms of their size and angular inclination and interact such that the braking elements (6, 7), which enter when triggered, are pressed laterally against the guide rail (3) or the projection (13) by the wedge narrowing and, by means of the wedge force, generate high braking forces in the frictional connection. The upwardly directed depth of entry of the braking elements (6, 7) in the housing (5) can be adjusted and limited by optionally adjustable stops (not shown).

In the event of safety braking, the braking elements (6, 7) move upward and counter to the downward direction of travel (32). The support means (16) in FIGS. 1 to 6 is/are designed to be resistant to deformation. The support means are connected, for example, in the housing (5), for example by a cross member or the like, to form a one-piece yoke which is resistant to deformation and laterally encompasses the guide rail (3). Alternatively, the support means can be fastened and supported in the housing (5) individually and in a suitable manner.

The safety brake device (4) has a clampable or lockable actuating device (9) for the braking elements (6, 7). The actuating device (9) is connected to the trigger (12) and can be controlled thereby. The actuating device (9) is designed such that it is unlocked and unclamped in response to a triggering event and brings the braking elements (6, 7), which are movable on both sides, into braking engagement with the guide rail (3). For this purpose, the actuating device (9) develops a feed force (F) directed transversely to the longitudinal axis (15) and a likewise directed feed movement when it is unclamped. This feed force and feed movement bring the braking elements (6, 7) on both sides into engagement with the guide rail (3) from a laterally distanced initial position. As a result of the engagement, the braking elements (6, 7) are held on the guide rail (3) by frictional contact and, during the downward travel (32) of the car (2), are moved in the opposite direction toward the safety restraint (8) and introduced there.

The actuating device (9) is moved back into the initial position thereof and clamped by the braking elements (6, 7) located on both sides in the safety restraint (8). The return movement and clamping can again be directed transversely to the longitudinal axis (15). In the initial position, the actuating device (9) can be locked again immediately or with a time delay.

The aforementioned orientation transverse to the longitudinal axis (15) of the guide rail (3) includes a perpendicular and an oblique orientation. The oblique alignment preferably has a predominant directional component perpendicular to the longitudinal axis (15).

In the embodiments shown, when the safety brake engagement is released, the car (2) is raised again counter to the downward travel direction (32), the actuating device (9) being clamped and locked in the initial position. During this lifting movement, the braking elements (6, 7) are released from the safety restraint (8) and can be moved downward by means of friction and their own weight. In this case, the braking elements can be guided by the guide device (18) and their downward movement can be limited by a stop or the like.

In the embodiments shown, the actuating device (9) executes a feed force (F) and feed movement directed exclusively or predominantly transversely to the longitudinal axis (15). Additional devices or drive means which act on the braking elements (6, 7) and push the braking elements upward or act along the longitudinal axis (15) can be dispensed with in the embodiments shown.

Figure 5:
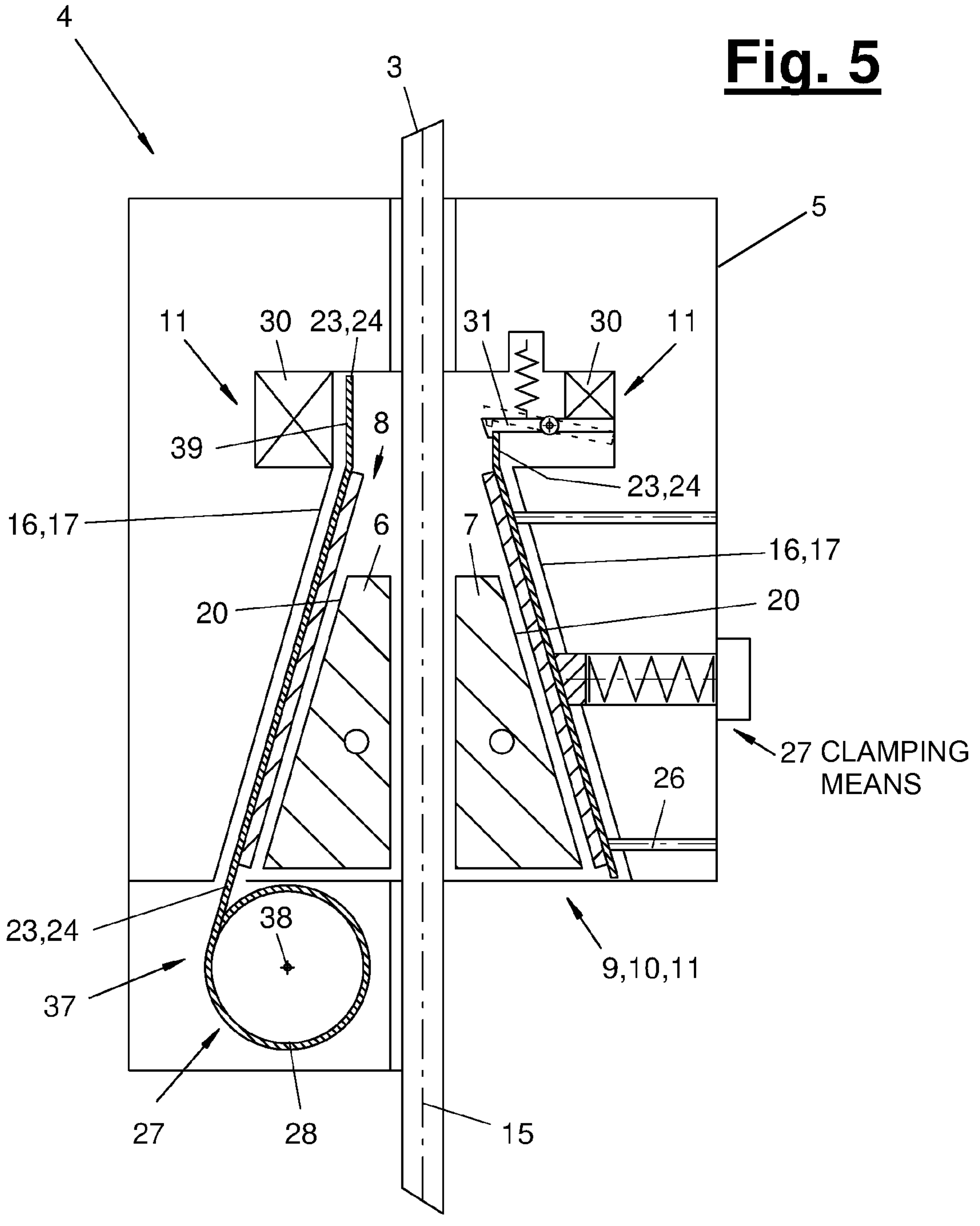
FIG. 5: two variants of the safety brake device from FIG. 1, having a structural and functional unit consisting of an actuating means and clamping means.

The actuating device (9) has a clampable feed device (10) for the braking elements (6, 7) on both sides. The actuating device also has a controllable locking device (11) for the feed device (10). The locking device (11) is connected to the trigger (12). The feed device (10) and the locking device (11) can each be designed in different ways. FIGS. 1 and 5 show different embodiments of this. Further modifications are also possible.

The feed device (10) has an actuating means (23), which can be brought into contact with a braking element (6, 7), and a clamping means (27). The feed device (10) can, for example, have the shown multiple arrangement of actuating means (23) and clamping means (27) arranged on both sides of the guide rail (3), each of which acts on one or more braking elements (6, 7) only on their rail side. Alternatively, a combination design is possible in which a common actuating means and/or a common clamping means acts on both sides of the guide rail (3) and acts on the braking elements (6, 7) on both sides.

In the variant from FIG. 1, the actuating means (23) and the clamping means (27) are each arranged separately from one another. The clamping means (27) acts on the actuating means (23), preferably on the rear face thereof. The actuating means (23) in turn, preferably on the front face thereof, acts on an associated braking element (6, 7). In the different embodiments, the feed device (10) has at least one actuating means (23) and at least one clamping means (27) in each case on both sides of the guide rail (3).

The clamping means (27) has at least one energy store (28). In FIG. 1, the energy store (28) is designed as a resilient element, in particular as a compression spring. The energy store (28) is oriented transversely to the guide rail (3) and is arranged and guided horizontally in the housing (5). The clamping means (27) can also have an adjusting means (29) for the energy store (28), by means of which the clamping force can be adjusted.

The actuating means (23) is arranged on the rear face of the at least one associated braking element (6, 7) that faces away from the guide rail (3). The actuating means is in this case located between the braking element(s) (6, 7) and the support means (16) of the housing (5). The actuating means (23) rests loosely against the braking element (6, 7) and the support means (16). The actuating means can transfer compressive forces. In FIG. 1, the actuating means (23) is designed, for example, as a planar transmission plate (24) having parallel main planes or outer walls.

The actuating means (23) is oriented, for example, in parallel with the wedge surfaces (17, 20) and has the same inclination with respect to the guide rail (3). The actuating means (23) is clamped between the wedge surfaces (17, 20) in the safety restraint (8).

When triggered, the actuating means (23) acted upon by the clamping means (27) executes a feed movement directed in the aforementioned manner transversely to the longitudinal axis (15), the actuating means entraining the associated braking element(s) (6, 7) and moving the element(s) from the initial position thereof, which is laterally distanced from the guide rail, to the guide rail (3) and into frictional contact with the guide rail. The braking elements (6, 7) are then moved along the longitudinal axis (15) in the direction of the safety restraint (8), the rear face of the braking elements sliding along the actuating means (23). The actuating means (23) can have a sliding means (25) for the associated braking element(s) (6, 7) on the front face thereof. This can be, for example, a low-friction coating, a roller cushion or the like.

The feed device (10) can have a guide (26) for the actuating means (23). In FIG. 1, the guide is designed, for example, as a linear guide, which is oriented transversely to the longitudinal axis (15) and guides the actuating means (23) in this direction during the aforementioned feed movement. The guide (26) can be formed and arranged between the actuating means (23) and the housing (5) or the support means (16).

In the variant from FIG. 1, the locking device (11) has an actuator (30) which acts directly on the feed device (10). The actuator acts, for example, on the actuating means (23) or the transmission plate (24). The action on the actuating means (23) or the transmission plate (24) can be direct. The locking device (11) can, for example, have the shown multiple arrangement of actuators (30) arranged on both sides of the guide rail (3), which actuators in each case only act on the feed device (10) or the actuating means (23) thereof on their rail side. Alternatively, a combination design is possible in which a common actuator (30) acts on both sides of the guide rail (3) and acts on the feed device (10) on both sides.

In FIG. 1, the actuators (30) on both sides are arranged in the housing (5) and, for example, above the support means (16). The actuating means (23) or transmission plates (24) are angled for this purpose at the upper end and have a vertical orientation at the end that is oriented in parallel with the active face of the relevant associated actuator (30). In the variant from FIG. 1, the actuators (30) are designed as electromagnets. The actuators (30) are connected to the trigger (12).

FIGS. 2 to 4 illustrate a safety brake operation.

FIG. 2 shows an initial position in which the feed device (10), together with the actuating means (23) thereof, assumes an initial position under tension of the energy stores (28), in particular springs. The actuating means (23) in this case preferably lie flat against the respectively associated support means (16) and the wedge surface (17) thereof. The actuating means (23) are held in this initial position by the locking device (11) and the actuators (30) thereof, in particular the energized electromagnet. The braking elements (6, 7) on both sides are laterally distanced from the guide rail (3) in the initial position.

When triggered, the actuators (30) release the feed device (10) and the actuating means (23) thereof, these being moved in the transverse direction to the guide rail (3) under the action of the energy stores (28) and pressing the respectively entrained braking element(s) (6, 7) against the guide rail (3). FIG. 3 shows this trigger position. The braking elements (6, 7) are in this case guided in the feed movement thereof by the guide device (18) shown in FIG. 1.

FIG. 4 shows the catch position in which the braking elements (6, 7) on both sides are moved upward along the guide rail (3) and into the safety restraint (8). The braking elements are also guided by the guide device (18), see FIG. 1, during this movement. In the catch position, the braking elements (6, 7) are pressed against the guide rail (3) with great wedge force and brake the movement of the car, preferably to a standstill.

In the catch position, the braking elements (6, 7) on both sides, as a result of their wedge shape, have moved the feed device (10) and its actuating means (23) back into the initial position shown in FIG. 2 and into contact with the relevant support means (16). The clamping means (27) have also been tensioned again. When the initial position is assumed or with a time delay, the locking device (11) can lock the feed device (10) again, the actuators (30) acting directly on the actuating means (23) and holding them in the initial position with magnetic force.

When the safety brake device (4) is opened and the car (2) is lifted, the braking elements (6, 7) are released from the safety restraint (8) again, as a result of their frictional engagement on the guide rail (3), and can slide downward along the actuating means (23) and the guide rail (3) into their initial position according to FIG. 2. If the safety brake device (4) is arranged on the counterweight, the above explanations apply with appropriate adaptation.

FIG. 5 shows two variants of the safety brake device (4), one of which is shown in the left-hand half of the image, and the other in the right-hand half of the image.

The second variant in the right-hand half of the image in FIG. 5 shows a modification relative to FIG. 1 with respect to the design of the locking device (11). In this case, the locking device (11) has a locking means (31) which interacts with the feed device (10), in particular with the associated actuating means (23), and holds it in place. The locking means (31) is designed, for example, as a movable, in particular pivotable, catch hook which encompasses and holds the upper end of the actuating means (23) or the transmission plate (24) in a form-fitting manner. Alternatively, a different design, for example as a vertical and displaceable, for example bolt-shaped, latch or the like is possible.

In this case, the actuator (30) acts indirectly on the feed device (10), in particular the associated actuating means (23) thereof. The actuator (30) acts on the locking means (31) together with a spring or some other triggering means. The actuator (30) acts counter to the triggering means and holds the locking means (31) in the locked position. When triggered, the actuator (30) releases the locking means (31), which in turn releases the feed device (10) under the action of the trigger. The actuator (30) can be arranged on the housing (5) or on a support means (16) which is rigid in this case, for example.

In this variant, the actuator (30) can also be designed as an electromagnet. If a locking means (31) is used, the actuator (30) can be weaker than the directly acting actuator (30) from FIG. 1 and requires less electrical energy for the holding function thereof. In addition, in the second variant, the actuator (30) can be arranged further away from the adjacent braking element (6, 7) and, when energized, has fewer magnetic effects on the braking element (6, 7).

The design of the locking device (11) having a locking means (31) can also be used in the other embodiments.

In the third variant, which is shown in the left-hand half of the image in FIG. 5, the actuating means (23) and the clamping means (27) are connected to form a structural and functional unit (37). The clamping means (27) or the energy store (28) thereof is in this case designed as a torsion spring, the actuating means (23) being formed by an upwardly protruding arm of the torsion spring, which spring has an axis arranged horizontally, for example. The torsion spring, which, in a suitable manner, is rotatably held or mounted on the housing (5) and supported at a support point (38), also guides the actuating means (23). The, for example, linear guide (26) which is present in the other embodiments can be omitted. The torsion spring is arranged, for example, below the associated braking element (6, 7), the actuator (30), as in the other design variants, being arranged above the braking element (6, 7) and acting directly or indirectly on the free end of the actuating means (23) at an action point (39). The clamping means (27) is pretensioned and attempts to press the actuating means (23) and the braking element (6, 7) against the guide rail (3).

Figure 11:
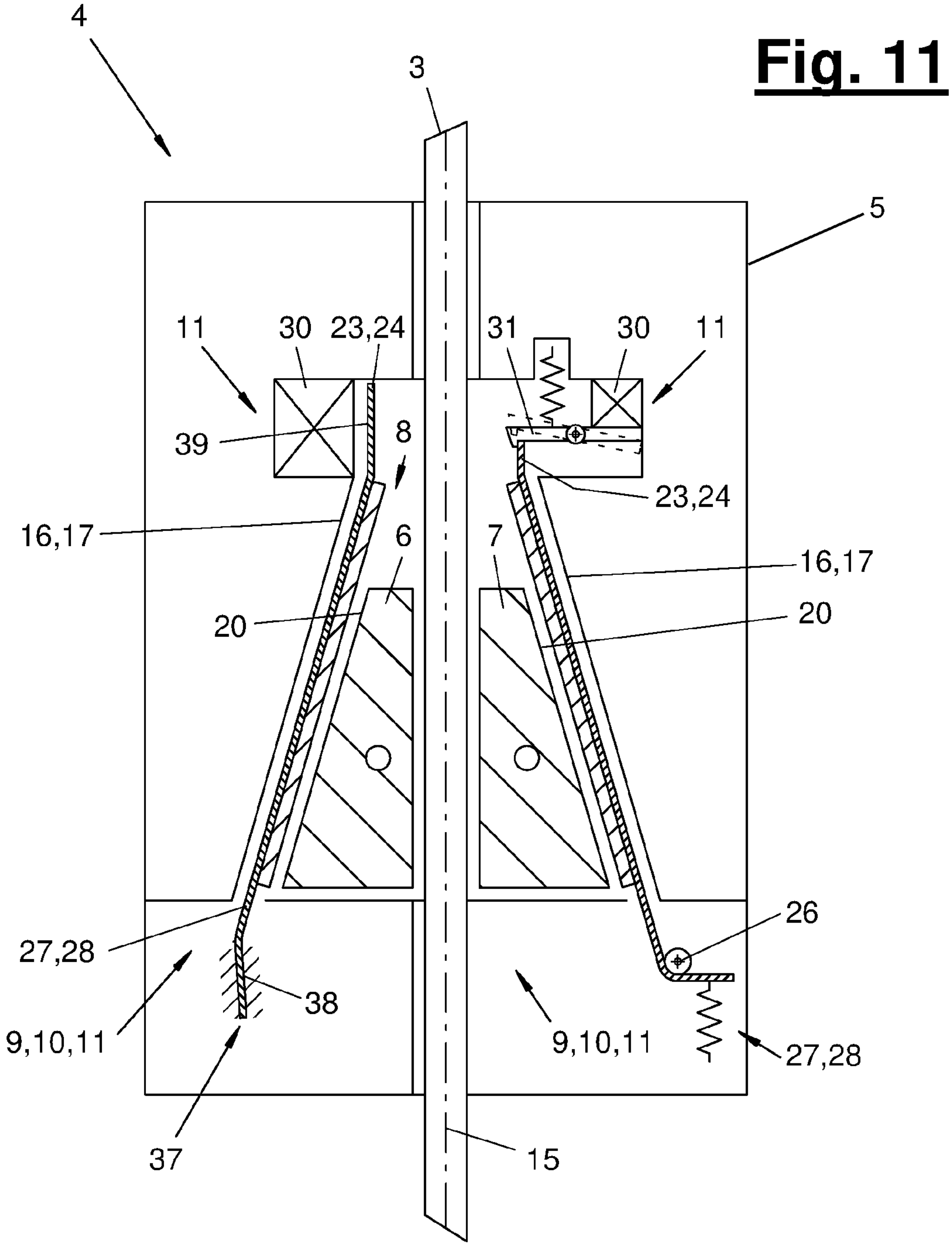
FIG. 11: further variants of the safety brake device.

In the left-hand half of the image, FIG. 11 shows a variant of the structural and functional unit (37) consisting of an actuating means (23) and clamping means (27). The structural and functional unit (37) is in this case designed as a leaf spring which is arranged in the housing (5) and pretensioned in the initial position. The preferably curved leaf spring forms both the clamping means (27), in particular the energy store (28), and, by means of its long and preferably straight arm, the actuating means (23). The leaf spring can be clamped and fixed at a support point (38) in the lower housing region. The action point (39) for the locking device (11), in particular the magnet, is located at the upper end of the leaf spring or the actuating means (23). In the aforementioned variants from FIGS. 5 and 11, the actuating means (23) is in each case designed as a transmission plate (24) in the manner described above.

Figure 6:
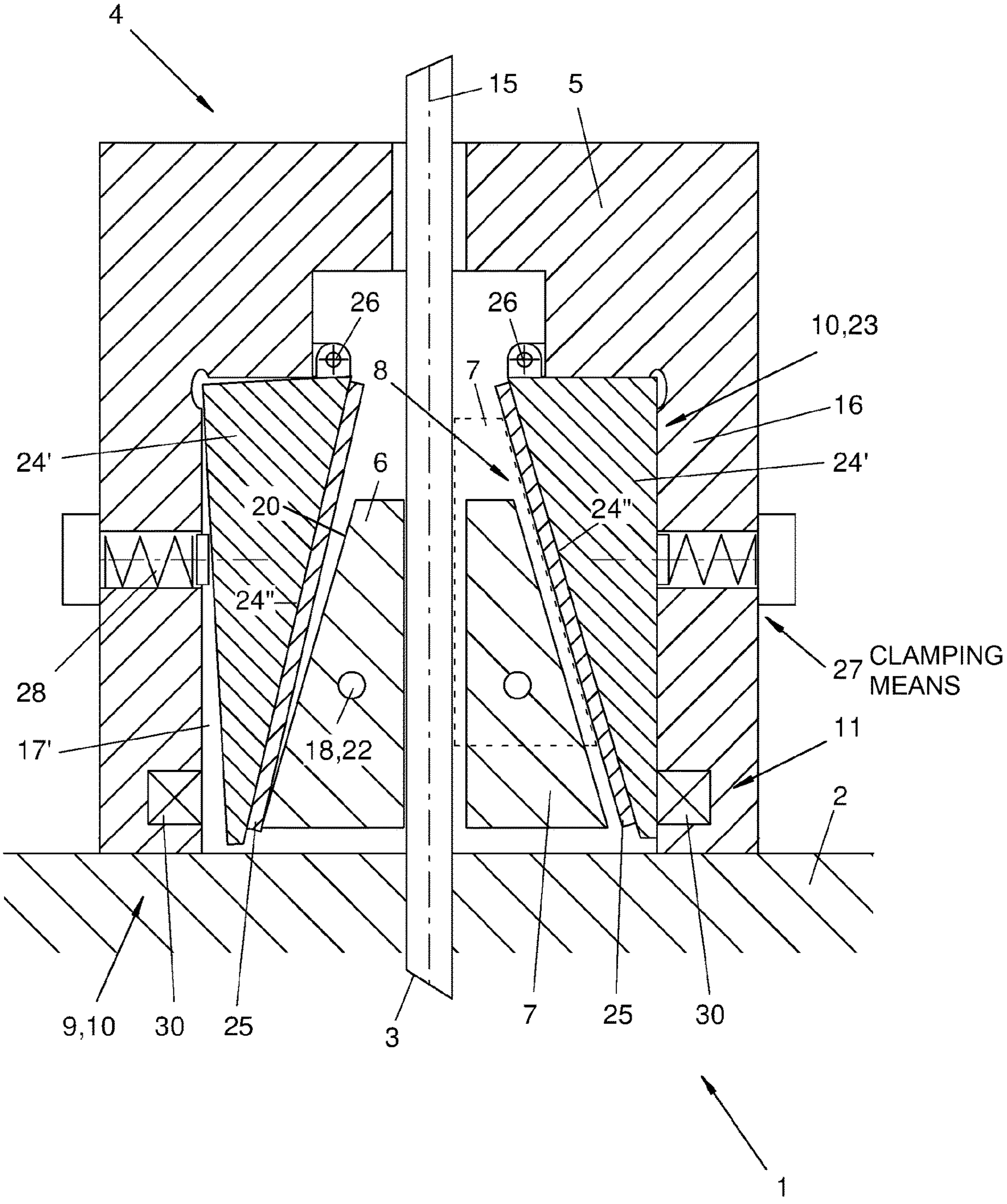
FIG. 6: a further variant of the safety brake device from FIG. 1 in different operating positions.

FIG. 6 shows a further variant having an actuating means (23) which has a wedge body (24') having an eccentric pivot bearing which forms the guide (26) in the form of a pivot guide. The guide (26) is arranged between the housing (5) and the wedge body (24'). The wedge body (24') has, on the front face thereof facing the guide rail (3), a wedge surface (24") which, together with the wedge surface (20) of the respectively associated braking element (6, 7), forms the aforementioned safety restraint (8). The guide device (18) can be designed in the manner described above.

The sliding means (25) can be arranged on the wedge surface (24"). The wedge body (24') tapers downward. The wedge body can have planar surfaces or walls oriented at right angles to one another on the rear face and the upper face.

In this variant, the support element (16), instead of the wedge surface (17), has a recess (17') which receives and supports the actuating means (23) and its wedge body (24') in the rest or initial position and in the catch position. In the right-hand half of the image, FIG. 6 shows the two positions, the catch position being shown by dashed lines. The recess (17'), which is recessed in a step-like manner, for example, can have support elements, in particular planar support surfaces and/or supporting projections. The shape of the recess can be adapted to the rear face and upper face of the wedge body (24').

The actuators (30) can, for example, be arranged at the lower end of the wedge body (24') and the recess (17'). The actuators (30) at the end of the wedge are easily accessible for repair purposes. The actuators can be designed to be relatively low-power and low-consumption. Alternatively, they can be located elsewhere.

The energy store (28) can store the potential energy of the actuating means (23), in particular of its wedge body (24'). If necessary, the energy store can also have a spring. The asymmetrical suspension of the wedge body (24') supports the feed movement by means of gravity in the event of a trigger. FIG. 6 shows this in the left-hand half of the image.

In a modification (not shown) of FIG. 6, the guide (26) can be formed by a linear guide on the upper face and optionally the lower face of the wedge body (24'). The linear guide can be directed transversely to the guide rail (3) or the longitudinal axis (15) thereof.

The right-hand half of the image in FIG. 11 shows a modification of FIG. 6, in which the actuating means (23) has a transmission plate (24), as in FIGS. 1 to 5. The guide (26) is arranged at the lower end of the actuating means (23) and in the housing (5). The guide is designed as a pivot guide. The actuating means (23) has a laterally angled arm, on which the clamping means (27) engages. The clamping means can, for example, have a spring as an energy store (28). The spring presses the pivotable actuating means (23) in the direction of the guide rail (3). The locking device (11) engages on the upper end of the actuating means (23) or the transmission plate (24). The locking device (11) has, for example, the locking means (31) described above. Alternatively, an actuator (30), in particular a magnet, can act directly. The locking device (11) and the guide (26) or the pivot bearing are arranged at the opposite ends of the actuating means (23) and are spaced relatively far apart from one another. The locking device (11) has a larger lever than the clamping means (27) and can be relieved by the correspondingly reduced holding force.

Figure 7:
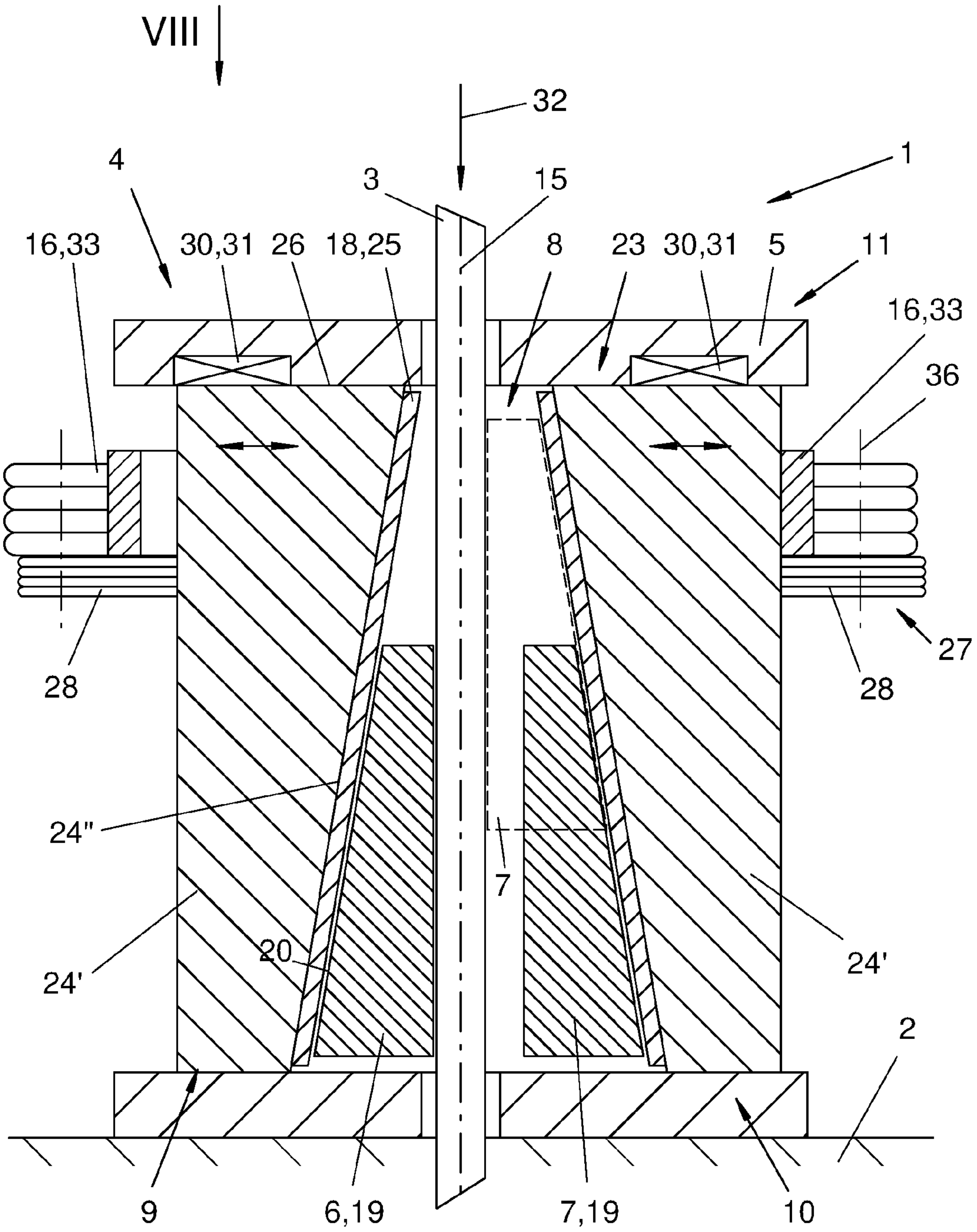
FIGS. 7 and 8: a further variant of the safety brake device from FIG. 1 in front view and plan view and in different operating positions.
Figure 8:
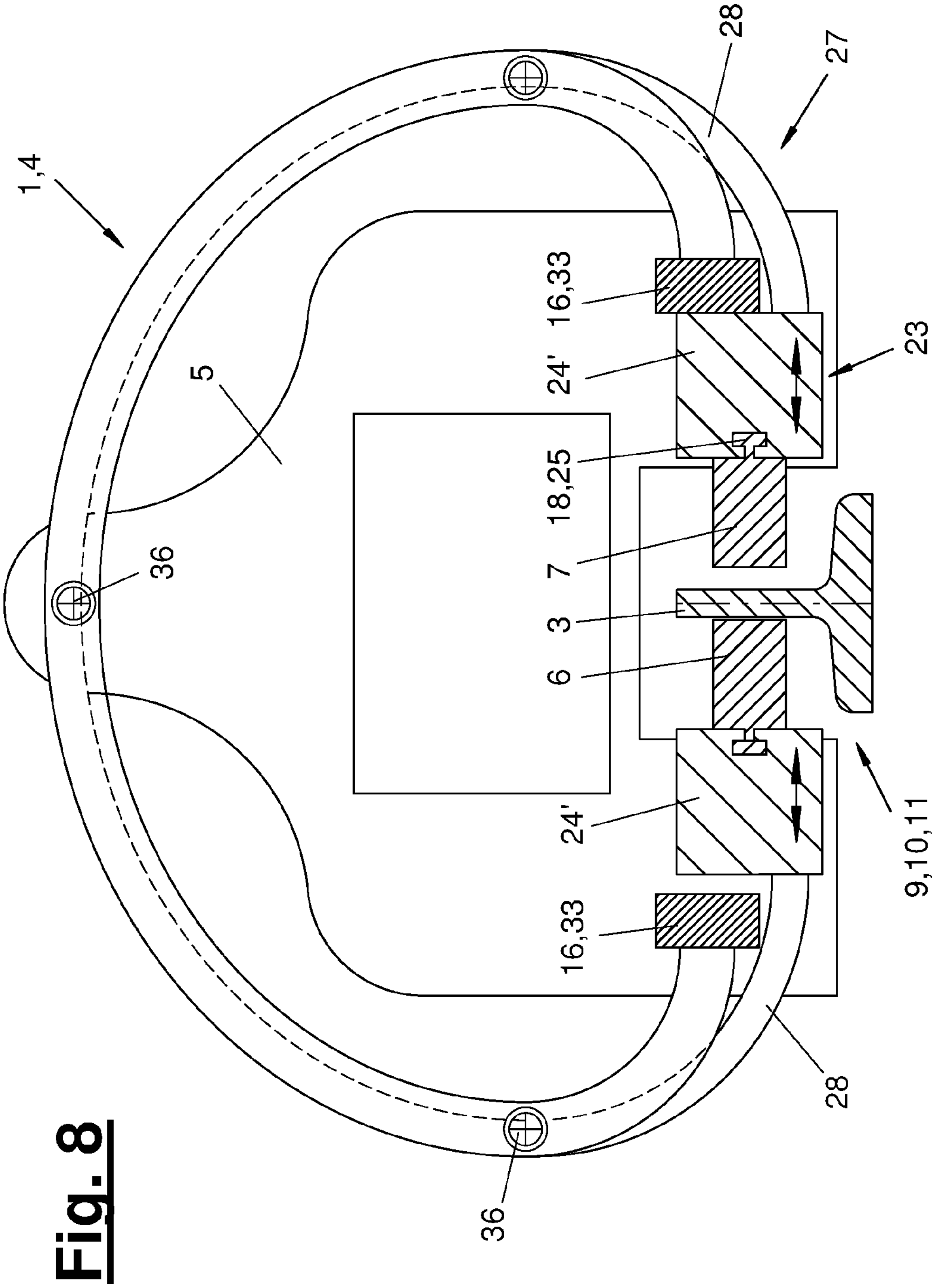

FIGS. 7 and 8 show a further variant of the safety brake device (4) in different operating positions. A front view is shown in FIG. 7. FIG. 8 shows a plan view according to arrow VIII of FIG. 7.

This variant differs from the embodiments described above by virtue of multiple features. The changes relate in particular to the design of the one or more support means (16), the locking device (11), the feed device (10), in particular its one or more actuating means (23) and the clamping means (17), and the guide device (18).

The one or more actuating means (23), similarly to in FIG. 6, are designed as a wedge body (24') having a wedge surface (24") facing the guide rail (3). The actuating means are movably arranged in or on the housing (5). The guide (26) can be designed, for example, as a linear guide oriented transversely to the longitudinal axis (15). The guide can, for example, be formed and arranged between the upper face and lower face of the wedge body (24') and the housing (5).

The guide (18) for the braking elements (6, 7), in particular wedge-shaped brake shoes (19), can be arranged between the feed device (10) and the relevant braking element (6, 7). In FIGS. 7 and 8, the guide is arranged and formed between the wedge surfaces (20, 24"). Furthermore, a sliding means (25) can also be arranged between the wedge surfaces (20, 24"). The guide device (18) can be designed as an undercut groove guide, for example, according to the plan view of FIG. 8. The guide (18) allows a sliding movement of the relevant braking element (6, 7) along the wedge surface (24") of the associated wedge body (24') and prevents detachment in the transverse direction. The braking element (6, 7) is held on the relevant wedge body (24') by means of the guide (18) and is entrained during its feed movement and restoring movement.

In the variant from FIGS. 7 and 8, the one or more support means (16) are movably arranged on the housing (5). The support means can move transversely to the longitudinal axis (15) of the guide rail (3). The support means can in particular yield in this direction. The movement path can be very small. The one or more support means (16) are acted upon by a spring arrangement (33) transversely to the longitudinal axis (15) of the guide rail (3).

In the embodiment from FIGS. 7 and 8, the support means (16) are designed as a spring arrangement (33), in this case in the form of a C-spring. The spring arrangement (33) is arranged horizontally and, according to FIG. 8, laterally encompasses the guide rail (3). Block-like abutment elements, for example, against which the relevant wedge body (24') rests loosely in the initial position and catch position, are arranged at the free spring ends. These positions are shown in FIGS. 7 and 8 in the right-hand half of the image in each case.

The spring arrangement (33) can be designed as a lamellar spring, for example, or in a different manner. The lamellar spring shown has a packet of a plurality of planar and curved resilient C-lamellae stacked on top of one another, each having high spring stiffness. The lamellae can be arranged on and connected to a curved support.

The spring arrangement (33) can be used to form a resilient safety restraint (8) which dampens the braking jolt. When the braking elements (6, 7) move into the safety restraint (8), the spring arrangement (33) is initially widened or spread apart out of its initial position. The resulting tension forces are absorbed and supported within the self-retaining spring arrangement (33). In the course of braking, or at the latest when the safety brake device (4) and the braking elements (6, 7) are released, the spring arrangement (33) returns to its initial position.

The spring arrangement (33) is held and supported on the housing (5) in a suitable manner, for example in a floating manner. This can be achieved by means of one or more holders (36), which are designed, for example, in a bolt-like manner. The holders allow the spring movement described above when the braking elements (6, 7) move into and out of the safety restraint (8). The holders also define the position of the spring arrangement (33) and the support means (16).

The clamping device (17) has also been modified in comparison with the embodiments described above. In the variant from FIGS. 7 and 8, the clamping device has an energy store (28) in the form of a spring. The energy store can, for example, also be designed as a lamellar spring and can also have a C-shape. The energy store can also be connected to the holders (36).

The spring (28) engages with the free spring ends thereof on the respectively associated wedge body (24'). The spring can be firmly or loosely connected to the relevant wedge body (24'). The spring (28) and the spring arrangement (33) can have the same direction of action.

The spring (28) has a lower spring stiffness than the spring arrangement (33). As in the embodiments described above, the spring presses on the actuating means (23) or wedge body (24') and, when the locking device (11) is triggered, presses the actuating means or wedge body in the direction of the guide rail (3). The C-spring has a smaller mouth width for this purpose than the spring arrangement (33). FIGS. 7 and 8, in the relevant left-hand half of the image, show the rail-side feed position of the braking element (6) and of the feed device (10) with its spring (28) and its actuating means (23) or wedge body (24').

The spring (28) can also be designed as a lamellar spring. The spring can also be connected to the one or more holders (36). In this case, sufficient movement play for the spring movements can be provided by means of elongate holes or the like. The spring (28) can, for example, be arranged on the spring arrangement (33) or integrated into the spring arrangement.

The locking device (11) can also be designed in a different manner. In the views of FIGS. 7 and 8, the locking device (11) has one or more actuators (30) which act on the respectively associated actuating means (23) or wedge body (24') directly or indirectly via a locking means (31). The locking device (11) can have a certain amount of movement play and can follow the yielding movements of the spring arrangement (33) when the braking elements (6, 7) move into and out of the safety restraint (8).

In another embodiment, not shown, the locking device (11) can act on the clamping means (27) and lock and block the clamping means in the clamped initial position. The actuator (30), and, if necessary, a locking means (31), can in this case be arranged between the clamping means (27), in particular the spring energy store (28), and the housing (5) or the spring arrangement (33). When associated with the spring arrangement (33), the actuator (30) can follow the aforementioned spring movements of the spring arrangement (33). At the same time, the clamping means (27) can also follow these spring movements. This applies in particular to the spring movement between the catch position and the initial position. In the case that the locking device (11) is associated with the housing (5) or the spring arrangement (33), the actuating means (23) or wedge bodies (24') are firmly connected to the clamping means and follow the movements thereof. When the clamping means (27) are locked in the initial position, the actuating means (23) or wedge bodies (24') are also held in the initial position.

Figure 9:
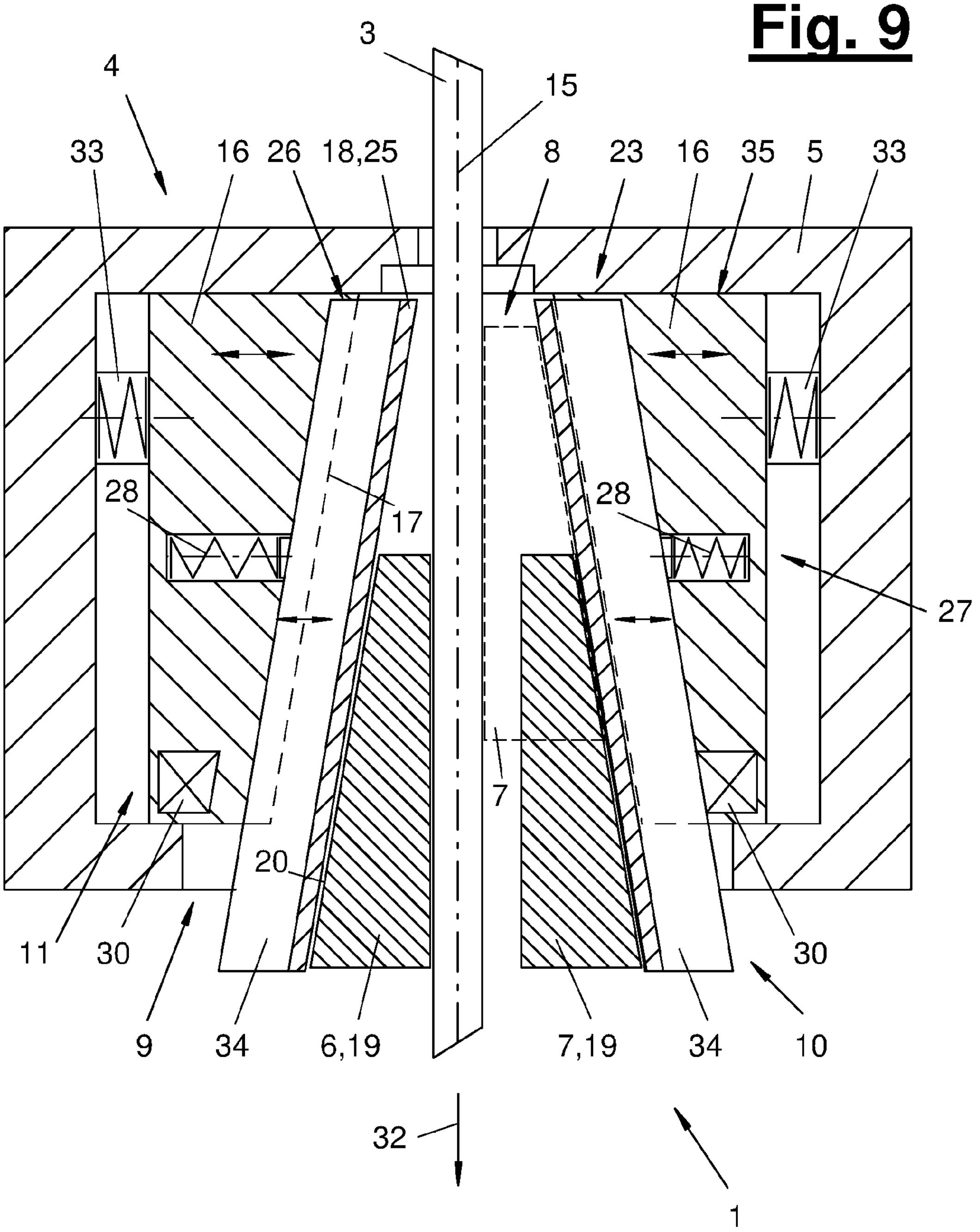
FIGS. 9 and 10: further variants of the safety brake device from FIG. 1 in different operating positions
Figure 10:
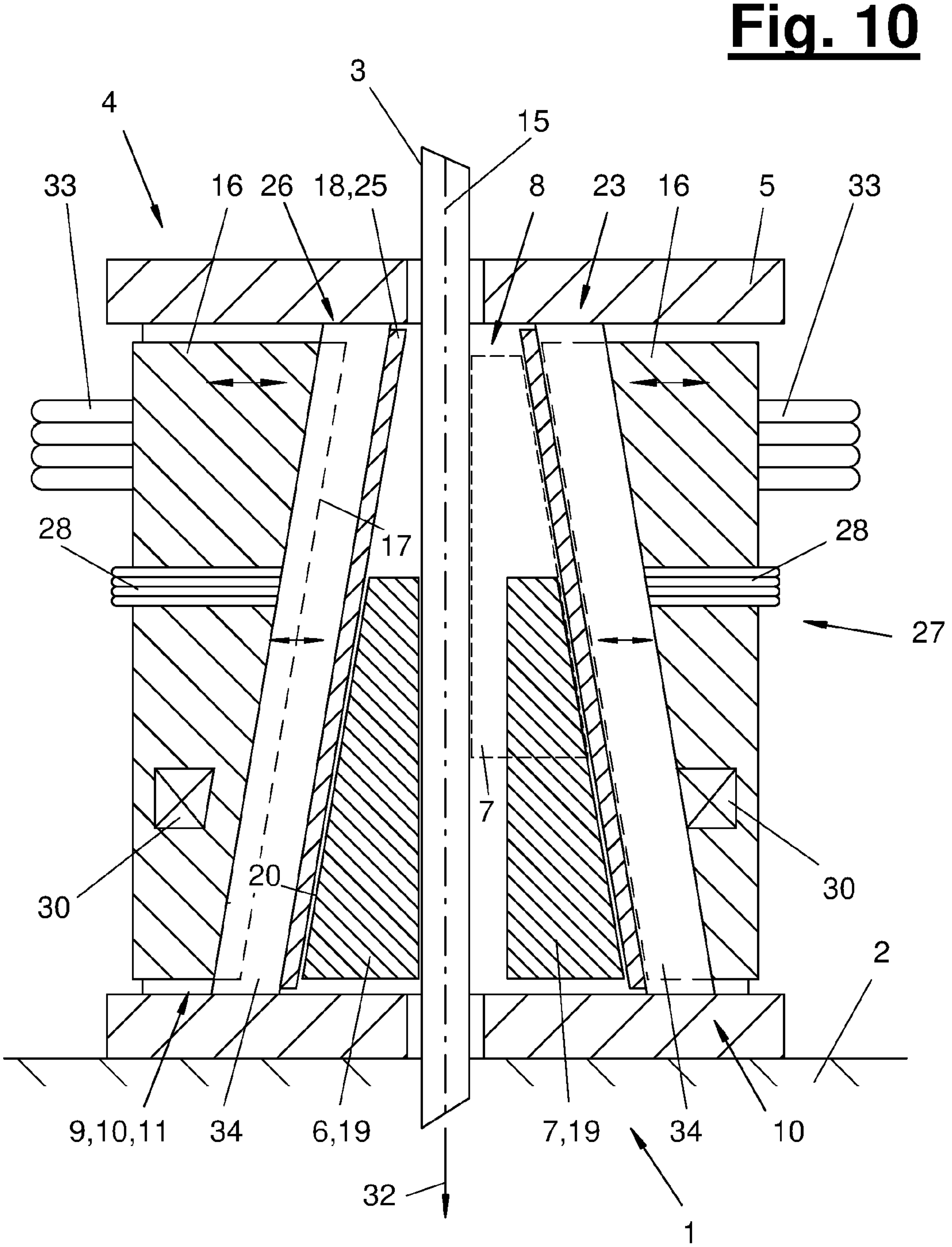

FIGS. 9 and 10 show two further variants of the safety brake device (4), which differ in a plurality of features from the embodiments described above.

In the variants from FIGS. 9 and 10, the one or more support means (16) are each movably arranged on the housing or frame (5). The support means are in this case each acted upon by a spring arrangement (33) which has a high spring stiffness and allows the support means (16) to yield slightly when the braking element (6, 7) moves into the safety restraint (8). The support means (16) can in this case yield in the transverse direction with respect to the longitudinal axis (15) of the guide rail (3), as a result of which the relevant spring arrangement (33) is tensioned, and a high clamping and spring force, which maintains the braking and holding effect of the safety brake device (4), develops.

In the variant from FIG. 9, movable support means (16) having a wedge surface (17) are arranged on both sides of the guide rail (3), each of which support means is movably guided transversely to the axis (15) by means of a linear guide (35) on the housing (5). The support means (16) are each acted upon by a spring arrangement (33) and pressed against the guide rail (3). The spring arrangement (33) can be formed, for example, by strong compression springs. The spring arrangements (33) are supported on the housing (5) in this case. Arrows indicate the direction of movement of the support means (16).

In the right-hand half of the image, FIG. 9 shows the initial position and, in dashed lines, the catch position of the braking element (7). The hidden wedge surface (17) is shown in dashed lines. The left-hand half of the image of FIG. 9 shows the feed position assumed after the actuator (30) has been triggered, with the actuating means (23), which is for example linearly displaced, and the contact of the braking element (6) with the guide rail (3).

In the variant from FIG. 9, the actuating means (23) of the feed device (10) is guided on the relevant support means (16) by means of a guide device (26). For this purpose, the actuating means (23) has a transmission profile (34) which, for example, can laterally encompass the associated support means (16) and the front edge thereof. The guide (26) can in this case be arranged between the actuating means (23) or transmission profile (34) and the respectively associated support means (16).

The support means (16) have the wedge surface (17) on the front face thereof which faces the guide rail (3). The relevant actuating means (23) can lie flat against this wedge surface (17) in the rest position and the catch position. For this purpose, the actuating means (23) or the transmission profile (34) has a correspondingly formed front face arranged in parallel with the wedge surface (17). Arrows indicate the movement between the actuating means (23) and the associated support means (16).

In the variant from FIG. 9, the clamping means (27) is arranged between the relevant support means (16) and the actuating means (23), in particular the transmission profile (34) thereof. In this case, the energy store (28) is formed by a spring, for example, in each case. The energy store (28) can be arranged in or on the relevant support means (16).

In the embodiment from FIG. 9, the guide device (18) can be arranged and formed between the actuating means (23), in particular the relevant transmission profile (34) thereof, and the respectively associated braking element (6, 7). The guide device (18) can be configured as an undercut groove guide, for example. Furthermore, a friction-reducing sliding means (25) can be arranged between the transmission profile (34) and the relevant braking element (6, 7). The braking elements (6, 7) are designed as wedge-shaped brake shoes (19), as in the previous embodiments.

From the feed position shown on the left-hand side, the braking elements (6, 7) are moved into the safety restraint (8), their wedge surfaces (20) pushing the relevant transmission profile (34) back into the initial position and into contact with the wedge surface (17). In this case, the support means (16) can also be pushed to the side a little and the spring arrangements (33) can be tensioned as a result.

The locking device (11) has actuators (30), for example electromagnets or the like, for directly or indirectly holding the relevant actuating means (23) or transmission profile (34). The actuators (30) are arranged on the support means (16).

In the variant from FIG. 10, movable support means (16) having wedge surfaces (17) are again present, which in this variant rest against a common spring arrangement (33). The spring arrangement (33) can be designed, for example, as a bracket-like or annular spring, in particular as a so-called C-spring. This spring arrangement can laterally surround the guide rail (3) in a yoke-like manner and can be connected to the outer faces of the support means (16). This can be a fixed connection, in which the spring arrangement (33) holds the support means (16) in the housing (5) in a floating manner. The spring arrangement (33) can be guided and held on the housing (5) in a suitable manner, for example in the apex region of the arched shape thereof.

The spring arrangement (33) can be designed as a lamellar spring, for example, or in a different manner. In the embodiment from FIG. 10, the guide (35) present in FIG. 9 can be omitted. Alternatively, a loosely abutting connection to guided support means (16), as in FIG. 9, may be present.

In the variant from FIG. 10, the actuating means (23) of the feed device (10) are again arranged so as to be movable relative to the support means (16). The guide (26) is in this case arranged and formed between the actuating means (23), in particular transmission profiles (34), and the housing (5). This can be arranged, for example, a linear guide on the upper face and lower face of the transmission profiles (34) and their contact point with the upper and lower housing plates.

The clamping device (27) is also designed differently in the variant from FIG. 10. The energy store (28) is formed, for example, by a likewise bracket-like or annular, in particular C-shaped, spring. The spring acts on the two actuating means (23) or transmission profiles (34) from the outside and, as a result, encompasses the support means (16) with lateral movement play. The energy store (28) can be arranged separately from the spring arrangement (33). Alternatively, it can be integrated therein.

The locking device (11) and the actuators (30) thereof are also arranged on the support means (16) in the variant from FIG. 10. As in FIG. 9, they can act directly on the relevant rear face of the transmission profiles (34) and hold them against the clamping means (27) in the rest position. Alternatively, indirect action is possible via a locking means (31) as discussed above.

In FIGS. 7 to 10, as in the embodiments described above, the safety brake catch device (4) can be suitably connected to the car (2) and/or the counterweight in a rigid or optionally floating manner. The catch device is also connected to a trigger (12) (not shown).

In addition to the variants shown, further modifications are possible. The one or more actuators (30) can be arranged below the braking elements (6, 7) and inside or outside the housing (5). For example, the third variant in the left-hand half of the image of FIG. 5 can be reversed accordingly.

The actuators (30) can be designed in a different manner, instead of the electromagnets shown. The actuating means can be, for example, actuators which are electrically energized and thereby expand, for example piezo elements or the like. In the event of an energy failure of the elevator (1), the actuators can react in a similar way to electromagnets and lose their force and holding effect in the event of a power failure.

In another variant, the energy stores (28) of the clamping means (27) can be designed as drive elements which are activated when triggered and only then develop a feed force (F) and feed movement and drive the actuating means (23).

In this variant, the energy stores (28) can be connected to an emergency supply device (not shown), in particular an emergency power device. The emergency supply device has, for example, a battery or a rechargeable battery and monitors the energy supply of the elevator (1) by means of a detection and control device. If excessive speed or excessive acceleration is detected, the energy store (28) designed as a drive element is activated via the battery or the rechargeable battery and carries out the feed movement. Otherwise, the drive element can also be controlled by the trigger (12), the energy for the drive element being supplied by the energy supply of the elevator (1) or possibly also by the emergency power supply. This design would have the advantage that a power failure does not immediately lead to an undesired application of the safety brake.

Instead of the straight guide or pivot guide shown, the guide (26) can be designed as a combined pivot and linear guide. The actuating means (23) can be rotatably held and guided, for example, on the lower face or at another point. The guide (26) also does not have to be particularly precise. This can, if necessary, be dispensed with if the movement space of the actuating means (23) is restricted in some other way. Furthermore, if necessary, a lifting means may be present which additionally acts on the braking elements (6, 7) and moves them along the guide rail (3) in the direction of the safety restraint (8), possibly only with a short impulse.

Otherwise, the features of the various embodiments described above and the modifications mentioned can be combined with one another and optionally also interchanged.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 Elevator
2 Car
3 Guide rail
4 Safety brake device
5 Housing
6 Braking element
7 Braking element
8 Safety restraint
9 Actuating device
10 Feed device
11 Locking device
12 Trigger
13 Projection
14 Back
15 Longitudinal axis
16 Support means
17 Wedge surface
17' Recess
18 Guide device
19 Brake shoe
20 Wedge surface
21 Pressing surface
22 Guide means
23 Actuating means
24 Transmission plate
24' Wedge body
24" Wedge surface
25 Sliding means
26 Guide
27 Clamping means
28 Energy store, spring
29 Adjusting means
30 Actuator, magnet
31 Locking means
32 Direction of travel
33 Spring arrangement
34 Transmission profile
35 Guide for support means
36 Holder
37 Structural and functional unit
38 Support point
39 Action point
F Feed force

The invention claimed is:

1. A safety brake device for an elevator, the elevator having an upright guide rail upon which the safety brake acts, the safety brake device comprising:

a housing having braking elements arranged on both sides of the guide rail and the braking elements being movable along the guide rail relative to the housing;

a safety restraint on both sides of the guide rail arranged between the housing and the braking elements;

a clampable and lockable actuating device for the braking elements, the actuating device unlocking and unclamping from an actuating device initial position in response to a triggering event and thereby bringing the braking elements into braking engagement with the guide rail;

wherein the actuating device, when unclamped, develops a feed force and a feed movement bringing the braking elements on both sides of the guide rail into engagement with the guide rail from a laterally distanced initial position of the braking elements;

wherein the braking elements, when engaged with the guide rail, are entrained by frictional contact on the guide rail and enter the safety restraint; and wherein the actuating device is moved back into the actuating device initial position as the braking elements enter the safety restraint and is clamped and locked in the actuating device initial position by the braking elements located in the safety restraint.

2. The safety brake device according to claim 1 wherein the actuating device develops the feed force and the feed movement directed transversely to the longitudinal axis of the guide rail.

3. The safety brake device according to claim 1 wherein the actuating device has a clampable feed device that generates the feed movement and acts on the braking elements.

4. The safety brake device according to claim 3 wherein the actuating device has a controllable locking device that locks the feed device in the initial position of the actuating device.

5. The safety brake device according to claim 1 wherein the actuating device has a controllable locking device that locks the actuating device in the initial position of the actuating device.

6. The safety brake device according to claim 5 including a trigger connected to the locking device for generating the triggering event.

7. The safety brake device according claim 1 including a guide device guiding the braking elements during movement of the braking elements.

8. The safety brake device according to claim 7 wherein the guide device is arranged between the housing and the braking elements or between a feed device of the actuating device and the braking elements.

9. The safety brake device according to claim 1 characterized in that the safety restraint is rigid or resilient.

10. The safety brake device according to claim 1 wherein the safety restraint is formed between the braking elements and at least one support means arranged on the housing.

11. The safety brake device according to claim 10 wherein the at least one support means is rigid and is fixed to the housing.

12. A method for safety braking an elevator, the elevator having an upright guide rail and a safety brake device for engaging the guide rail, the method comprising the steps of:

providing the safety brake device adjacent to the guide rail, the safety brake device having a housing, braking elements in the housing and arranged on both sides of the guide rail, the braking elements being movable along the guide rail relative to the housing, a safety restraint on both sides of the guide rail between the housing and the braking elements, and a clampable and lockable actuating device for the braking elements;

in response to a triggering event, unlocking and unclamping the actuating device from an actuating device initial position thereby bringing the braking elements into braking engagement with the guide rail;

the actuating device, when unclamped, developing a feed force and a feed movement directed transversely to a longitudinal axis of the guide rail, the feed force and the feed movement bringing the braking elements into engagement with the guide rail from a laterally distanced initial position of the braking elements, the engaged braking elements being entrained by frictional contact on the guide rail and entering the safety restraint during movement of the safety braking device parallel to the longitudinal axis of the guide rail; and moving the actuating device back into the initial position of the actuating device as the braking elements enter the safety restraint, the actuating device being clamped and locked by the braking elements located in the safety restraint.

13. The method according to claim 12 wherein the actuating device develops the feed force and the feed movement directed transversely to the longitudinal axis of the guide rail.

14. The method according to claim 12 wherein the actuating device has a clampable feed device for moving the braking elements with the feed movement and a controllable locking device for the feed device, the locking device holding the clamped feed device in the initial position of the actuating device.

15. The method according to claim 14 wherein that the feed device has an actuating means that is brought into contact with at least one of the braking elements during the feed movement, and a clamping means connected the actuating means to form a structural and functional unit.

16. The method according to claim 15 wherein the locking device acts on the actuating means at a distance from a support point of the clamping means on the housing.

17. The method according to claim 16 wherein the locking device is a magnet.

* * * * *